(12) United States Patent
Tam (10) Patent No.: US 11,957,121 B2
(45) Date of Patent: Apr. 16, 2024

(54) ELECTROSTATIC INSECT REPELLENT

(71) Applicant: Jonathan Tam, Fremont, CA (US)

(72) Inventor: Jonathan Tam, Fremont, CA (US)

( * ) Notice: Subject to any disclaimer, the term of this patent is extended or adjusted under 35 U.S.C. 154(b) by 260 days.

(21) Appl. No.: 17/690,392

(22) Filed: Mar. 9, 2022

(65) Prior Publication Data
US 2022/0287293 A1 Sep. 15, 2022

Related U.S. Application Data (60) Provisional application No. 63/158,857, filed on Mar. 9, 2021.

(51) Int. Cl.
*A01M 29/28* (2011.01)
(52) U.S. Cl.
CPC .................................. *A01M 29/28* (2013.01)
(58) Field of Classification Search
CPC .................................................... A01M 29/28
See application file for complete search history.

(56) References Cited

U.S. PATENT DOCUMENTS

| | | | | |
|---|---|---|---|---|
| 10,004,219 | B1* | 6/2018 | Morello | A01K 1/035 |
| 2006/0198245 | A1* | 9/2006 | Cheung | A42B 1/24 |
| | | | | 367/139 |
| 2012/0269900 | A1* | 10/2012 | Watkinson | A01N 25/00 |
| | | | | 424/646 |
| 2015/0150237 | A1* | 6/2015 | Valls | A01M 29/28 |
| | | | | 43/132.1 |
| 2017/0280702 | A1* | 10/2017 | Garcia | A01M 29/28 |

FOREIGN PATENT DOCUMENTS

WO 1999044418 9/1999

* cited by examiner

*Primary Examiner* — Sherman Ng
(74) *Attorney, Agent, or Firm* — Dergosits & Noah LLP (57) ABSTRACT

An apparatus and method are provided for repelling insects. An electrostatic field is provided about a user by: connecting the user directly to a source of high voltage and low current; or providing a conductive garment about the user and connecting the conductive garment to a source of high voltage and low current. At a sufficiently high voltage, the electrostatic field become effective at repelling insects from the user.

13 Claims, 9 Drawing Sheets

ELECTROSTATIC INSECT REPELLENT

CROSS-REFERENCE TO RELATED CASES

This application claims priority to U.S. Provisional Patent Application No. 63/158,857, entitled "Electrostatic Insect Repellent," filed Mar. 9, 2021, which is hereby incorporated by reference in its entirety.

FIELD OF THE INVENTION

The present subject matter relates generally to insect repellents, specifically electrostatic insect repellents.

BACKGROUND

Biting insects, such as the mosquito, are a well-known pest in many climates. Typical methods for repelling include topical repellents, e.g., sprays and lotions, and spatial repellents, e.g., citronella candles. However, such methods are unsatisfactory for a number of reasons. For instance, repellents applied to the user only protect the skin that the repellent is applied to. Also, applications of such repellents need to be repeated regularly. Furthermore, the user must themselves endure the application of such chemicals, or breathe their burnt residue. Ultrasonic devices designed to repel insects are known, but their effectiveness is unproven.

Thus, what is needed is an effective apparatus that repels insects without requiring the user to endure repeated applications of chemicals, or the burning of chemicals.

BRIEF DESCRIPTION OF THE DRAWINGS

The embodiments are illustrated by way of example and not limitation in the accompanying drawings, in which like references indicate similar elements, and in which.

DETAILED DESCRIPTION

In embodiments, an electrostatic generator is used to form a high voltage field surrounding the user, which discourages insects, e.g., biting insects, such as mosquitoes, from landing on the user's skin. Embodiments thereby protect the user's entire body without the need for reapplication because the electrostatic generator is connected to, and creates a field that emanates from, or surrounds, the user's skin. In an embodiment, the electrostatic generator includes a voltage multiplier, which may include a Villard cascade. In an embodiment, the electrostatic generator may include a Van de Graaff generator. In an embodiment, the electrostatic generator may be connected to a conductive garment from which the field emanates. In embodiments, the user may be a human or other animal. In embodiments, the user may also be a thing to be protected from insects, such as food.

In an embodiment, the electrostatic generator includes a Villard cascade connected to a power source, such as a battery. An output wire from the Villard cascade is connected to a metal pad, which is attached to a user's skin. A wire from a ground side of the Villard cascade is connected to the bottom of a shoe (to provide a ground), with the high voltage output wire connected to the skin with a small conducting pad. The embodiment is completely portable and will provide insect repelling effects wherever the person goes as long as the battery is charged.

Figure 1:
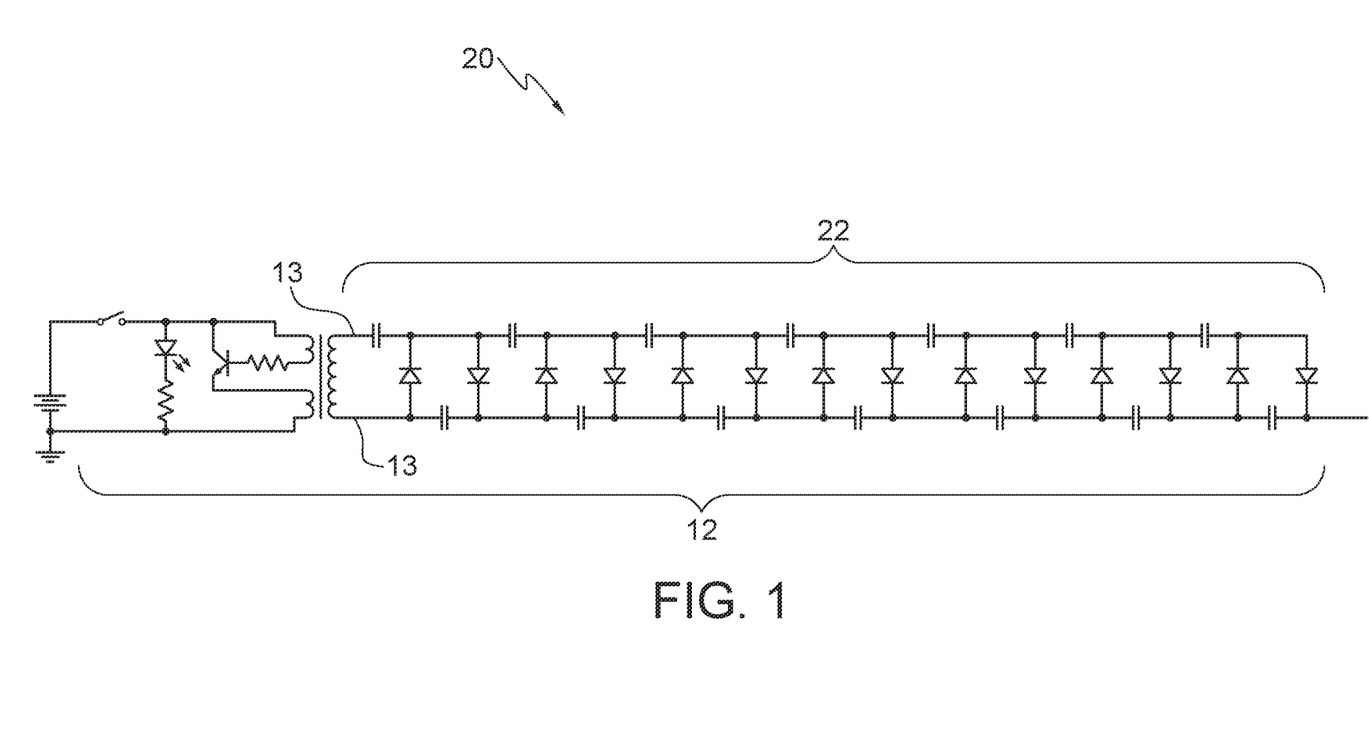
FIG. 1 is a circuit diagram illustrating an embodiment of a circuit for an electrostatic insect repellent.
Figure 6:
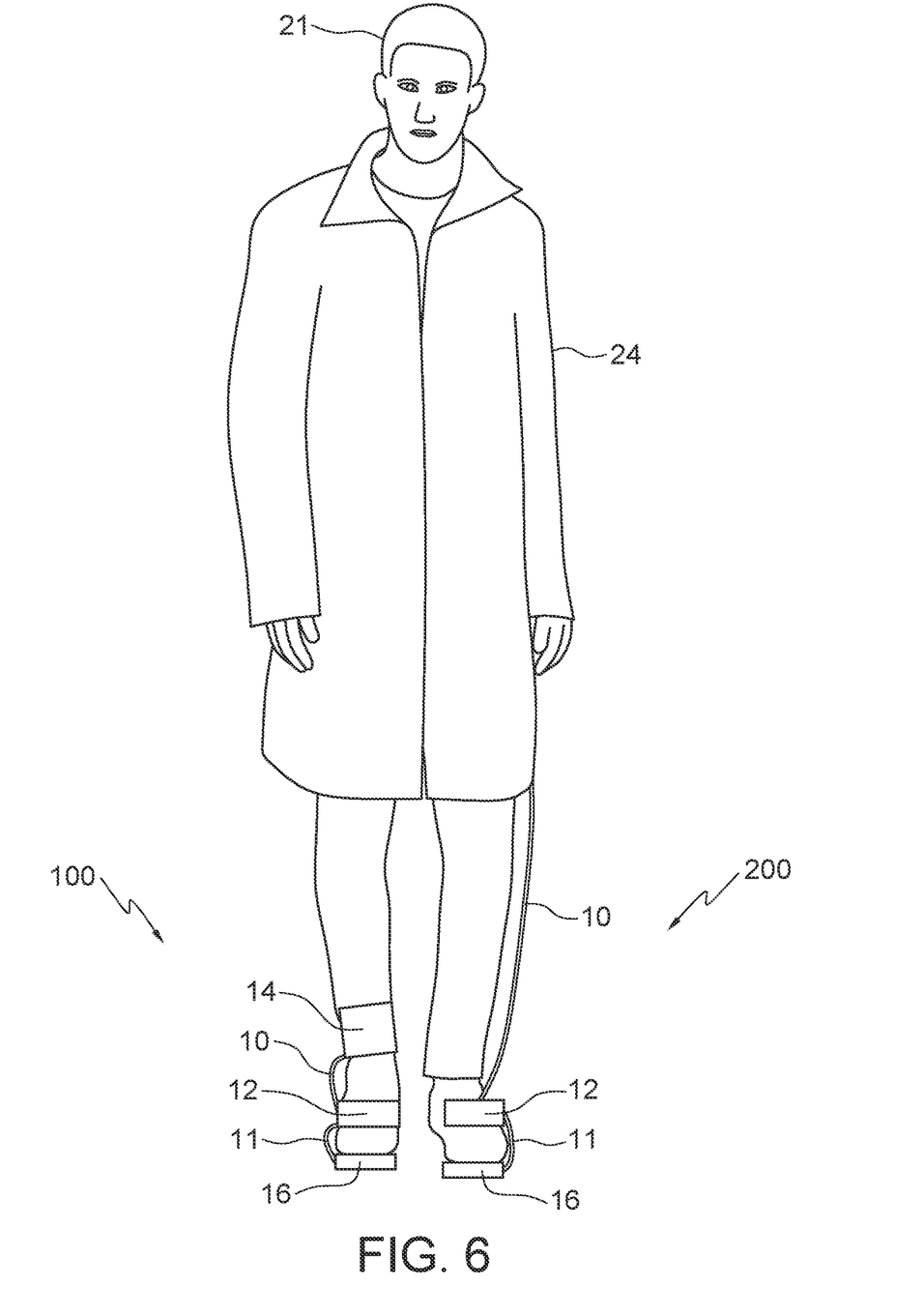
FIG. 6 is an illustration of embodiments of an electrostatic insect repellent.

FIG. 1 is a circuit diagram illustrating an embodiment of a circuit 20 for embodiments of electrostatic insect repellents 100, 200 (FIG. 6). Circuit 20 may be used to generate a high voltage electrostatic field using a power supply 2, e.g., a battery, to power a transformer 7, which in turns powers a voltage multiplier 22, which in this embodiment is shown as a Villard cascade. The Villard cascade includes capacitors 8 and diodes 9 arranged in stages, each stage include one capacitor 8 and diode 9. This embodiment of voltage multiplier 22 includes 14 such stages, which result in a multiplication of the transformer voltage by fourteen at an output connection 10. Overall, circuit 20 provides an electrostatic generator that increases the voltage of power supply 2, while also decreasing current, allowing for this device to be used safely on a person.

Figure 5:
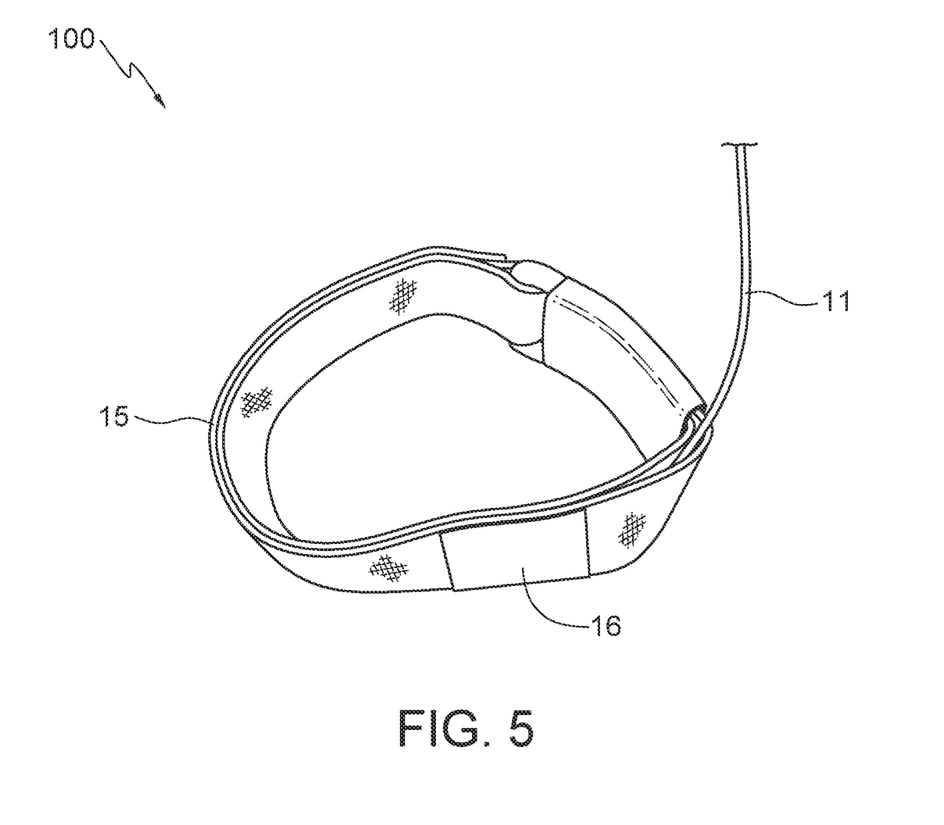
FIG. 5 is a perspective view of an aspect of an embodiment of an electrostatic insect repellent.

Circuit 20 further includes an electronic switch 1 for switching circuit 20 on and off. In the circuit, an LED 3 is used to indicate to the user that the electrostatic circuit has been switched on, with a resistor 4 (in this example, of 1 kΩ) used to reduce the current to a proper and safe amount. For example, a safe current could be below 1 milliamp, which would not typically be felt by the user. At a negative terminal of power supply 2, a grounding wire 11 is attached, which is shown in FIG. 5 to contact the earth through a conducting pad 16.

The voltage provided by power supply 2 passes through transistor 6 a resistor 5 (in this example, of 2.2 kΩ) to a switch mode power supply transformer 7. One example of a switch mode power supply transformer includes an EE19 Ferrite Core transformer, which may be used to step up the transformer output voltage to approximately 700V. Another example of a switch mode power supply transformer 7 may be used to boost the transformer output voltage to from 500V-1000V. The choice of transformer 7 depends on the voltage desired to be used to repel insects, which is discussed further below. Transformer 7 allows for the voltage of a DC power supply 2 to be converted to AC power while also stepping up the voltage, which is connected to voltage multiplier 22 through soldered wire connections 13.

Following the transformer is voltage multiplier 22. In this example, voltage multiplier 22 includes a Villard cascade consisting of capacitors 8 and diodes 9. Capacitors 8 and diodes 9 are connected in stages 23, with each stage consisting of one capacitor 8 and one diode 9. A Villard cascade multiplies the input voltage by the number of stages, with embodiments having between 13-20 stages, depending on the choice of transformer 7 and its output voltage, and the voltage desired at output 10. As shown, the example has 14 stages and generates a voltage at output 10 of approximately 9800V relative to the ground. Thus, the voltage at output wire 10 from a Villard cascade is a product of the voltage supplied by transformer 7 and the number of stages. Circuit 20, aside from output 10 and ground 11 wires, may be placed within a small container 12 (FIG. 1 indicates the part of circuit 20 within container 12 and FIG. 2 illustrates the actual container 12) for ease of use and carrying.

In an embodiment, capacitors 8 may be 100 pF (rated to 3 kV) and diodes 9 are rated to 3 W. These ratings are, for safety purposes, rated high enough to accommodate the high voltage output (discussed within). Preferably, capacitors 8 are rated high enough to maintain a ripple voltage lower than the rating of the capacitors and diodes, and so the minimum depends on the transformer voltage selected. In addition, capacitors 8 are preferably rated low enough to reduce the risk of shock. In the embodiment, 100 pF was thought to be near the upper end of the acceptable range. Preferably, diode 9 is also rated to a voltage at least double the voltage output of transformer 7. In this embodiment, a 9V battery is used, though other power sources may be used as well, including, but not limited to, AA or AAA batteries.

Figure 2:
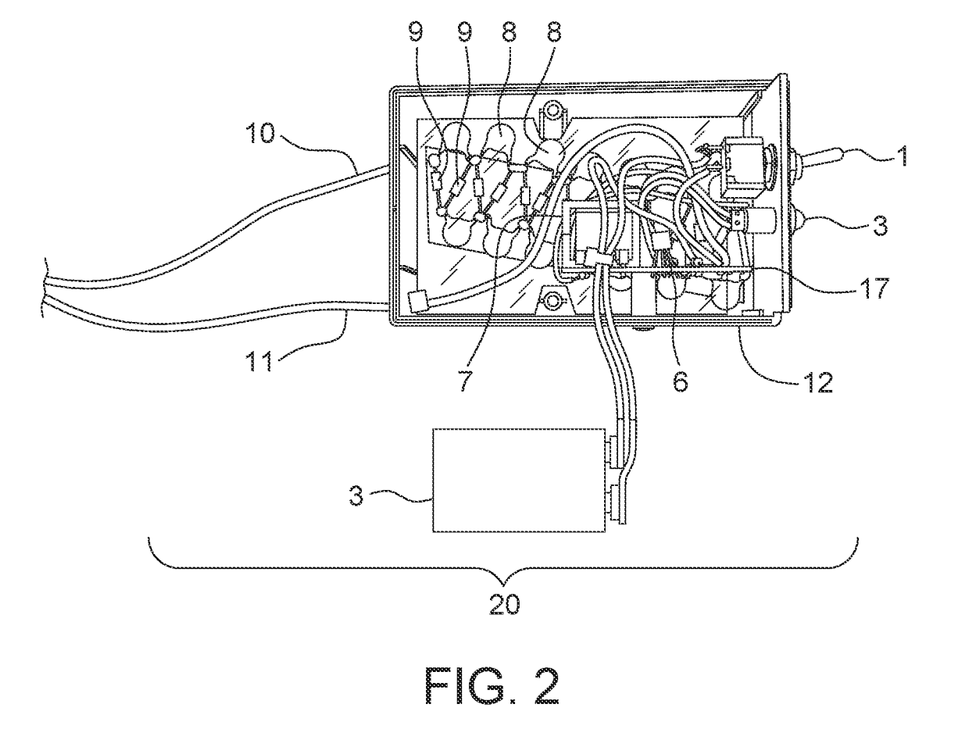
FIG. 2 is a top view of the interior of an embodiment of an electrostatic insect repellent.

FIG. 2 is a top view of the interior of an embodiment of an electrostatic insect repellent in which circuit 20 is housed within container 12, making the embodiment portable. FIG. 2 illustrates a protoboard 17 to which transistor 6 and transformer 7 are connected, and how switch 1, power supply 2 (e.g., a 9V battery), LED 3, and the remainder of circuit 20 (except for output 10 and grounding wire 11) may be soldered together and arranged within container 12 for portability and ease of use. As shown in FIG. 2, some components are soldered together in a line (in the Villard cascade) while other components are placed on a protoboard. However, as one of skill will realize, the arrangement of the components within container 12 is arbitrary and all other such configurations are envisioned and included in the scope of this disclosure. For example, all components may be placed on a single protoboard to reduce the amount of space required.

Figure 3:
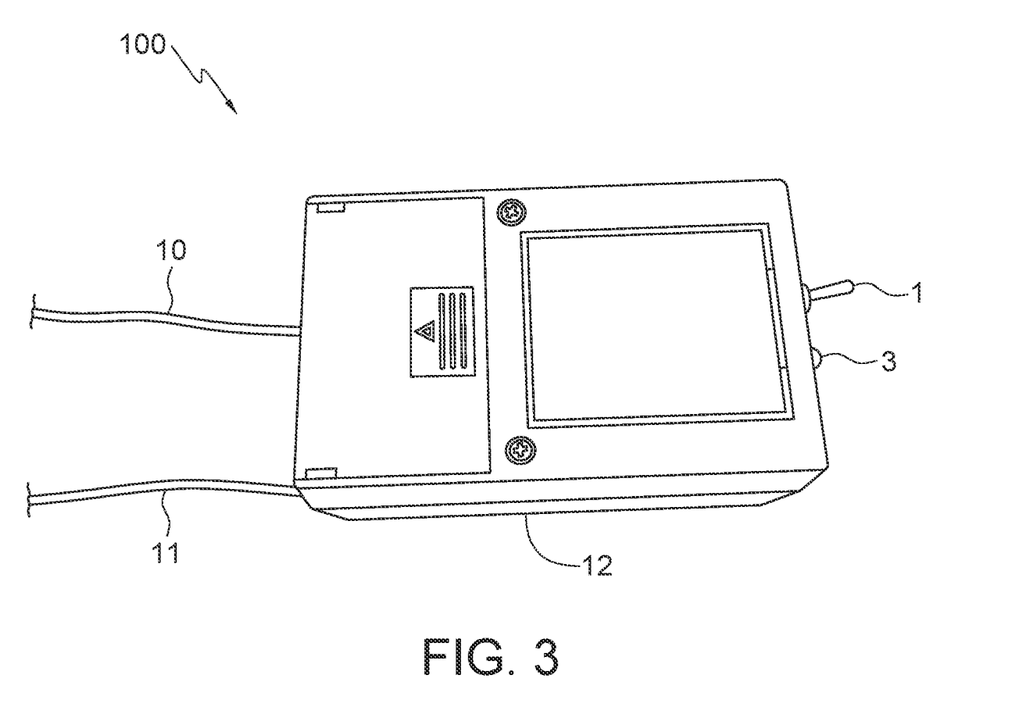
FIG. 3 is a top view of the embodiment of an electrostatic insect repellent of FIG. 2.

FIG. 3 is a top view of the embodiment of an electrostatic insect repellent of FIG. 2, illustrating the exit of output 10 and ground wire 11 from container 12. In FIG. 3, container 12 is rectangular and, as illustrated by the 9V battery (FIG. 2), relatively small. Furthermore, container 12 is preferably a dielectric (e.g., plastic) to protect the user from the circuit within. As one of skill will understand, the shape and size of container 12 is arbitrary, so long as the interior volume is large enough to house the components chosen and all other such shapes and sizes are envisioned and included in the scope of this disclosure. In an embodiment, container 12 may be attached to a strap that wraps around the user, e.g., the user's ankle (see FIG. 6), so the device may be used hands-free.

In the example shown in FIG. 3, some components are soldered together in a line (in the Villard cascade) while all other components, like the transformer, are placed on a protoboard. However, other versions of the preferred embodiment may have all components placed on a single protoboard to reduce the amount of space it takes up. Overall, this electrostatic generator increases the voltage while also decreasing current while maintaining a high voltage, allowing for this device to be used safely on a person.

In FIG. 3, an example of the preferred embodiment of a small, rectangular container for the electrostatic generator is shown, though other sizes and shapes are possible as well. This is preferred because it houses all the units of the generator and protects the user from the circuit by surrounding it on all sides with a dielectric (in the example of FIG. 3, this is plastic). The switch 1 and LED 3 are attached to the outside of the container for easy access while the circuit itself is enclosed. The container is attached to a strap that wraps around the user's ankle so the person can use it hands free.

Figure 4:
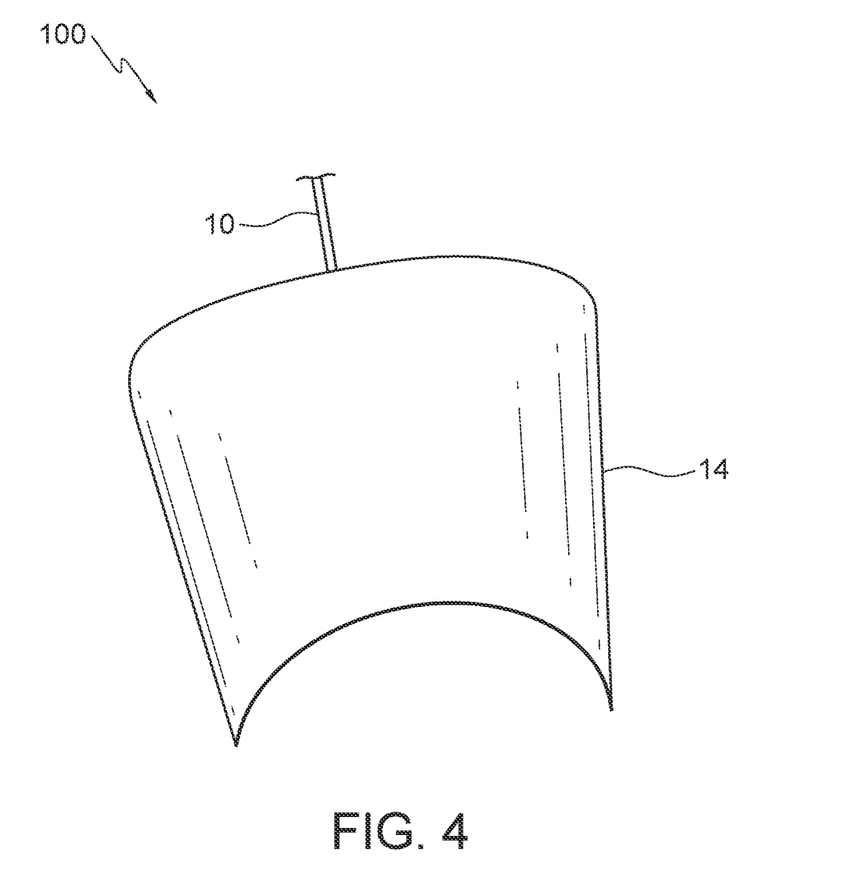
FIG. 4 is a perspective view of an aspect of an embodiment of an electrostatic insect repellent.

FIG. 4 is a perspective view of an aspect of an embodiment of an electrostatic insect repellent. In FIG. 4, output wire 10 is shown to connect to a conducting pad 14. In the embodiment 100 (FIG. 6), conducting pad 14 is connected directly to the user's skin, e.g., about the ankle. In the embodiment 200 (FIG. 6), output wire is connected to a garment 24 with conductive material. In other embodiments, conducting pad 14 may be configured to connect to other parts of the body, e.g., in in locations such as the sole of the foot, where container 12 may be located conveniently close to the ground.

FIG. 5 is a perspective view of an aspect of an embodiment of an electrostatic insect repellent. In FIG. 5, grounding wire 11 is shown to electrically connect to a conducting pad 16, which creates a ground for circuit 20 when pad 16 contacts the earth. In the embodiment, conducting pad 16 may be provided on a strap 15 to be placed about the user's shoe so that pad 16 comes into contact with the earth. In the embodiment, pad 16 is made relatively larger than wire 11 to increase the surface area making contact with the Earth. The connection made by conducting pad 16 serves as a ground reference voltage for circuit 20, which allows electrons (provided by the electrostatic generator) to build on the user's skin, or garment.

Regarding the voltage at output wire 10, experiments were conducted to determine effective voltages. In these experiments, with output voltages from 0V to 2800V, the repellency rate remained at 0%. It was surmised that the lack of effectiveness, even at 2800V, was likely because electrostatic fields decay according to an inverse square law, meaning a higher voltage was required. Beginning at 4200V, the repellency rate began to increase. Somewhat above 5,000V, the repellency rate achieved 50%. At 7,000V, repellency increased significantly to 85%±5.37%. At a voltage of 9800V, a maximum of 1 mosquito landed in a test, leading to an average repellency rate of 97.48%±1.02%. Thus, a rough interpolation between the repellency at 7,000V and 9,800V shows a 90% repellency being provided by an output voltage of approximately 8,000V, and 95% efficacy being provided by an output voltage of approximately 9,250V. However, the data also showed decreasing changes in repellency as voltage was increased from 7,000V to 9,800V. Thus, while higher voltages may be used, they increase repellency a negligible amount.

FIG. 6 is an illustration of embodiments of an electrostatic insect repellent. In embodiment 100, electrostatic generator circuit 22 within container 12 is connected by output 10 to conductor pad 14 against the skin of user 21 by being wrapped about their ankle (shown with pants partially transparent). Embodiment 100 creates an electrostatic field about user 21 by charging the skin of user 21. In embodiment 200, electrostatic generator circuit 22 within container 12 is connected by output 10 directly to a conductive garment 24 wrapped about user 21. For example, garment 24 may have conductive elements woven into it. Embodiment 200 creates an electrostatic field about garment 24 and also about user 21 within garment 24. Thus, embodiments 100, 200 provide an electrostatic charge to the user, or to the garment about the user, creating an electrostatic field about the user that repels insects.

Figure 7A:
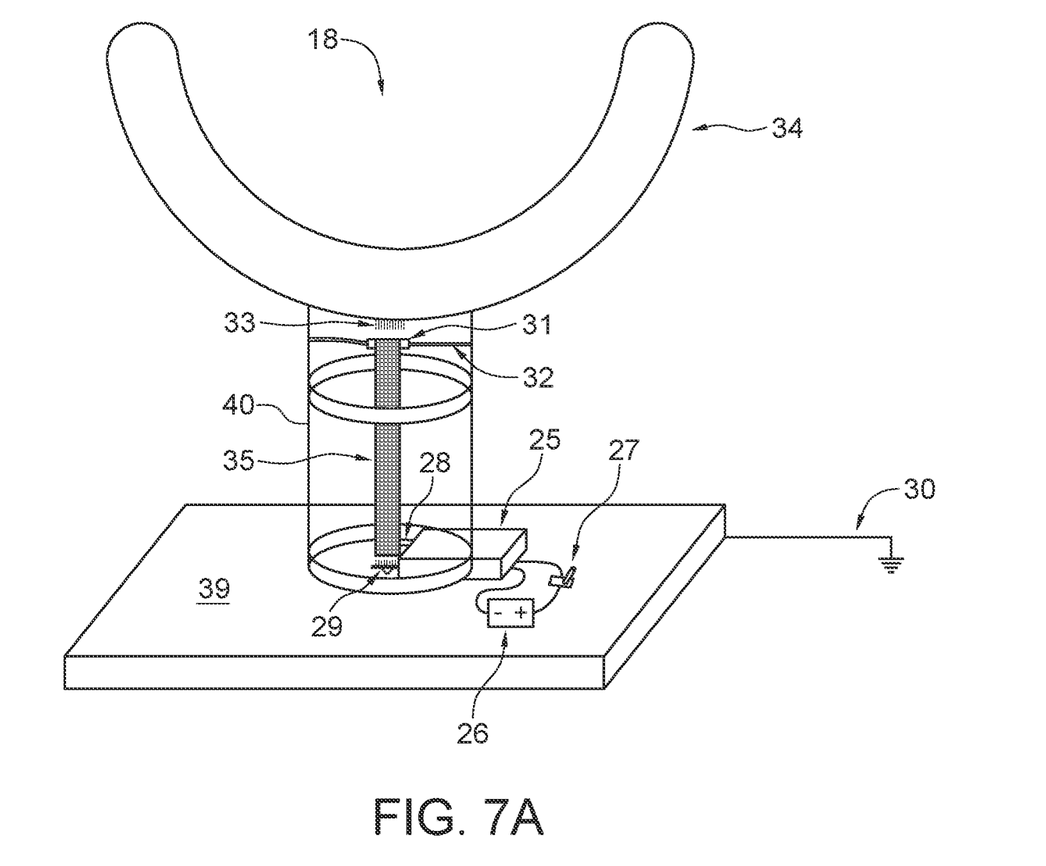
FIG. 7A is a perspective view of an aspect of an embodiment of an electrostatic insect repellent.
Figure 7B:
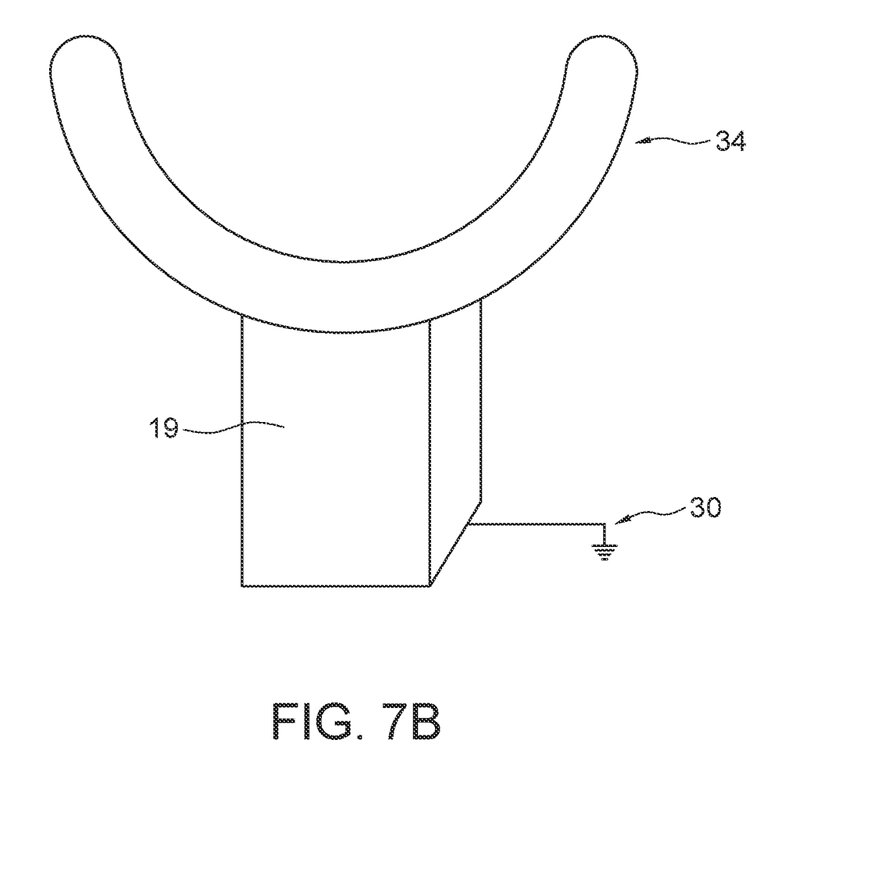
FIG. 7B is a perspective view of an aspect of the embodiment of an electrostatic insect repellent of FIG.

FIG. 7A and FIG. 7B are perspective views of aspects of an embodiment of an electrostatic insect repellent. In an embodiment, circuit 20 may include a Van de Graaff generator 18 instead of a Villard cascade. The container for this embodiment may be similar to that of the embodiment of FIG. 1-FIG. 6, i.e., using a container 19 (FIG. 7B) to house the electrostatic generator. In FIG. 7A, Van de Graaff generator 18 is shown to include a motor 25 powered by a power supply 25 (e.g., a 9V battery) with an on/off switch 27. Motor 25 turns an axle (not shown, but oriented horizontally) within a horizontally-oriented (as shown) Teflon tube 28. Bare, stranded wires 29 extend from a non-conducting base 39 and are electrically connected to a ground 30, which provides the earth ground in a manner similar to grounding wire 11, described earlier, which itself may be connected to a ground conducting pad 16, as shown in the embodiments of FIG. 1-FIG. 6. Pad 16 is pressed against the skin of a user (preferably at the ankle) when container 19 is strapped securely to the user.

Van de Graaff generator 18 further includes an upper Teflon tube 31 that may spin about a non-conducting axle 32 mounted to a cylinder 40. A stretchable rubber conveyer belt, or band, 35, about tubes 28 and 31 is turned by the rotation of tube 28 induced by motor 25. Bare, stranded wires 33 extend from a top of container 19 (shown in FIG. 7B) and are electrically connected to pad 34. Stranded wires 33 extend toward tube 31 and belt 35 without touching belt 35. Similarly, stranded wires 29 extend toward tube 28 and belt 35 without touching belt 35. In FIG. 7A, container 19 is not shown to assist in the description. In embodiments, stranded wires 33 and connecting pad 34 may be separated and connected by a conducing wire, such that connecting pad 34 is distanced from stranded wires 33. In the embodiment, DC motor 25 may be, for example, a 3V DC motor.

Near the top of cylinder 40, Teflon tube 31 is rotatable about a non-conducting axle 31, with axle 31 oriented in parallel with tube 28 and in parallel with the top of container 19. Extending between Teflon tubes 28, 31 is a loop or belt of stretchable rubber 35, such as a rubber band. Belt 35 is preferably small enough to be stretched tightly when pulled across both tubes 28, 31. When motor 25 is on, the rotation of tube 28 causes belt 35 to act as an electrostatic conveyor belt, bringing charge from ground 30 to stranded wires 33, and on to the user via conducting pad 34. This embodiment generates an electrostatic field when connected to a user's skin or garment in a similar way as the voltage multiplier, this time using a Van de Graaff generator rather than a Villard cascade to generate the voltage at conducting pad 34. In embodiments, Teflon tubes 28, 31 may be made of another non-conductive material.

Figure 8A:
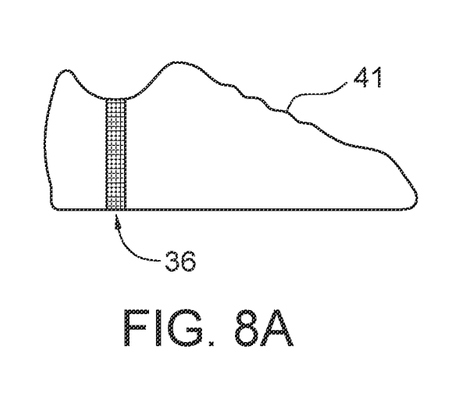
FIG. 8A is a side view of an aspect of an embodiment of an electrostatic insect repellent.
Figure 8B:
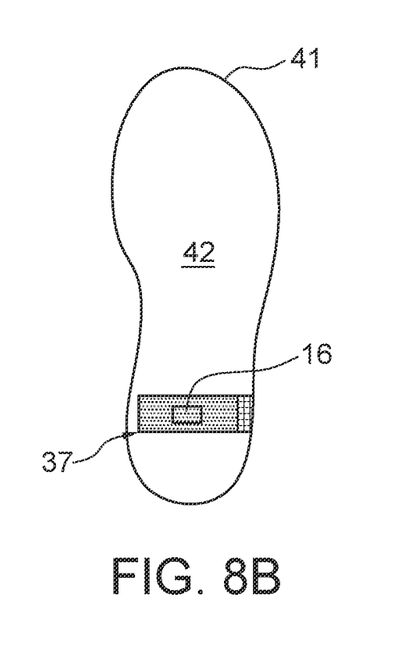
FIG. 8B is a bottom view of the aspect of an embodiment of an electrostatic insect repellent of FIG. 8A.
Figure 8C:
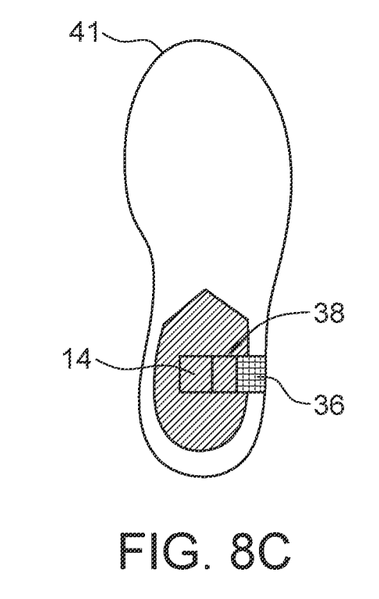
FIG. 8C is a top view of the aspect of an embodiment of an electrostatic insect repellent of FIG. 8A.

FIG. 8A, FIG. 8B, and FIG. 8C are side, top, and bottom views, respectively, of an aspect of an embodiment of an electrostatic insect repellent. In FIG. 8A-8C, circuit 20 is contained within a flat, disk-shaped container 38 that may be included within a user's shoe 41, with conducting pad 14 included on a user-contacting, or conductive garment-contacting, upper surface of container 38 and ground conducting pad 16 including on a sole 42 of shoe 41. In the embodiment, grounding wire 11 may be included in a strip 36 routed from container 38 to a ground pad 37 holding ground conducting pad 16. The embodiment thus provides for using the device hands-free. In the embodiment, strip 36, attached to disk-shaped container 38, may be a long, narrow, and rectangular hard plastic, such as PVC, which maintains its shape when bent. Container 38 is connected to one end of strip 36 with grounding wire 11 from circuit 20 running through strip 36 and ground pad 37 to conducting pad 16.

With this embodiment, strip 36 may be wrapped around the outside of the shoe, with the end (ground pad 37) bent to be parallel with the bottom of the shoe. This allows the ground conducting pad 16 (and grounding wire 11) to reach the ground conveniently without the use of an additional strap 15.

The previous description is provided to enable any person skilled in the art to practice the various aspects described herein. In the embodiments, the separation of various system components in the embodiments described above should not be understood as requiring such separation in all embodiments. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. An apparatus for repelling insects, comprising:
    an electrostatic generator including: a plurality of stages, each stage including a capacitor and a diode;
    a battery power supply;
    a transformer; and
    a first electrical contact connected to an output of the electrostatic generator, and configured to connect to a user, and having a designed potential of at least 7,000 volts,
    wherein:
    when the first electrical contact is connected to the user and the apparatus is powered, the battery power supply supplies DC power to the transformer and the transformer supplies AC power to the electrostatic generator and an electrostatic field is created about the user.

2. The apparatus of claim 1, wherein:
    the first electrical contact is configured to connect to skin of the user.

3. The apparatus of claim 1 further including:
    a second electrical contact connected to a ground side of the electrostatic generator and configured to contact an earth ground.

4. The apparatus of claim 3 further including a foot strap, wherein the second electrical contact being configured to contact an earth ground includes the second electrical contact being incorporated into the foot strap.

5. The apparatus of claim 1, wherein the electrostatic generator includes a voltage multiplier.

6. The apparatus of claim 5, wherein the voltage multiplier includes a Villard cascade.

7. The apparatus of claim 1, wherein the electrostatic generator includes a Van de Graaff generator.

8. The apparatus of claim 1, wherein the plurality of stages includes at least 14 stages, each capacitor has a capacitance of at most 100 pF and is rated to at least 3 kV, and each diode is rated to 3 W.

9. The apparatus of claim 8, wherein the designed potential of the first electrical contact is at least 9,800 volts.

10. The apparatus of claim 1, further including a housing configured to house the electrostatic generator, battery power supply, and transformer and configured to be carried by the user.

11. The apparatus of claim 1, wherein the first electrical contact being configured to connect to a user includes the first electrical contact being configured to connect to a garment including conductive material, such that:

when the first electrical contact is connected to the garment and the garment is worn by the user, the electrostatic field is created about the user.

12. A method for repelling insects from a user, the method including:
   providing an electrostatic field about the user by:
   providing the user with an apparatus including:
      an electrostatic generator including a plurality of stages, each stage including a capacitor and a diode;
      a battery power supply;
      a transformer, the battery power supply supplying DC power to the transformer and the transformer supplying AC power to the electrostatic generator; and
      a first electrical contact connected to an output of the electrostatic generator and with a designed potential of at least 7,000 volts, and configured to connect to the user; and
   connecting the first electrical contact to the user to create the electrostatic field about the user.

13. The method of claim 12, wherein the apparatus includes a housing configured to house the electrostatic generator, battery power supply, and transformer, and configured to be carried by the user.

* * * * *